United States Patent

Holl

(10) Patent No.: US 7,100,998 B2
(45) Date of Patent: Sep. 5, 2006

(54) METHOD AND DEVICE FOR CONTROLLING WHEEL BRAKES OF A MOTOR VEHICLE

(75) Inventor: Eberhard Holl, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 590 days.

(21) Appl. No.: 09/935,155

(22) Filed: Aug. 22, 2001

(65) Prior Publication Data

US 2002/0033642 A1 Mar. 21, 2002

(30) Foreign Application Priority Data

Aug. 23, 2000 (DE) .......................................... 100 41 444

(51) Int. Cl.
*B60T 8/32* (2006.01)

(52) U.S. Cl. ..................... 303/191; 477/194; 477/195

(58) Field of Classification Search ............. 477/194, 477/195, 196, 197, 198; 303/191
See application file for complete search history.

(56) References Cited

U.S. PATENT DOCUMENTS

| | | | | |
|---|---|---|---|---|
| 4,629,043 A | * | 12/1986 | Matsuo et al. ............... 477/184 |
| 4,717,207 A | * | 1/1988 | Kubota et al. ................. 303/3 |
| 5,043,896 A | * | 8/1991 | Sol ............................. 701/80 |
| 5,129,496 A | | 7/1992 | Sigl et al. |
| 5,452,946 A | * | 9/1995 | Warner ...................... 303/24.1 |
| 5,484,044 A | * | 1/1996 | Bursteinas et al. .......... 188/353 |
| 5,667,282 A | * | 9/1997 | Kim ............................... 303/3 |
| 5,769,752 A | * | 6/1998 | Kim ........................... 477/114 |
| 5,916,062 A | * | 6/1999 | Siepker ....................... 477/194 |
| 6,009,984 A | | 1/2000 | Zechmann et al. |
| 6,056,373 A | | 5/2000 | Zechmann et al. |
| 6,086,515 A | * | 7/2000 | Buschmann et al. ........ 477/194 |
| 6,193,332 B1 | * | 2/2001 | Ono ............................ 303/191 |
| 6,199,964 B1 | * | 3/2001 | Ota et al. .................... 303/192 |
| 6,260,934 B1 | * | 7/2001 | Lee ............................. 303/192 |
| 6,332,654 B1 | * | 12/2001 | Yano .......................... 303/89 |

FOREIGN PATENT DOCUMENTS

| | | |
|---|---|---|
| DE | 196 21 919 | 12/1997 |
| DE | 196 25 919 | 1/1998 |
| DE | 198 48 209 | 4/2000 |
| DE | 199 12 878 | 4/2000 |
| DE | 199 41 482 | 4/2000 |
| EP | 03 75 708 | 1/1992 |
| EP | 1 008 503 | 6/2000 |
| EP | 0 812 747 | 8/2002 |
| JP | 63-188556 | 8/1988 |

* cited by examiner

*Primary Examiner*—Robert A. Siconolfi
*Assistant Examiner*—Melanie Torres
(74) *Attorney, Agent, or Firm*—Kenyon & Kenyon

(57) ABSTRACT

A method and a device for controlling wheel brakes of a vehicle, in which braking force is maintained and/or built up in at least one operating state at at least one wheel of the vehicle irrespective of the extent of pedal actuation. Such an operating state is present when the slope of the road points in the direction of the vehicle's future direction of travel and/or when the parking brake is engaged.

8 Claims, 3 Drawing Sheets

METHOD AND DEVICE FOR CONTROLLING WHEEL BRAKES OF A MOTOR VEHICLE

FIELD OF THE INVENTION

The present invention relates to a method and a device for controlling wheel brakes of a vehicle.

BACKGROUND INFORMATION

In European Patent No. 0 375 708, corresponding to U.S. Pat. No. 5,129,496, an implementation of an automatic parking brake by suitable control of a braking system is discussed. To do so, if the brake pedal is depressed and the vehicle speed drops below a very low speed value, the braking pressure is locked in, i.e., maintained at a constant level or optionally increased in at least one wheel brake via the operation of pressure-generating means, by switching at least one valve in at least one wheel brake. The locked-in braking pressure is reduced again when it is recognized that the driver wishes to perform a standing start.

In German Published Patent Application No. 196 21 628, corresponding to U.S. Pat. No. 6,009,984, is discussed an automatic parking brake function (hillholder function), which is activated when the vehicle comes to a stop with the service brake engaged. The braking pressure or braking force then prevailing is maintained or increased in at least one wheel brake, irrespective of the extent to which the brake pedal is depressed, and is then reduced again when the brake pedal is released. Such a hillholder function eliminates extensive safety measures. To support standing starts, on slopes, for example, when the brake pedal and clutch pedal are pressed simultaneously, the clutch pedal takes over the activation or deactivation of the hillholder function when the brake pedal is released. Since this device takes into account only one special standing start operation in which the brake pedal and clutch pedal are pressed simultaneously at least at one point in time, not all standing start operations, e.g., a standing start on a slope or with the parking brake engaged, are optimally handled. Therefore, the device cannot be used universally.

In German Published Patent Application No. 196 25 919, corresponding to U.S. Pat. No. 6,056,373, is discussed a creep suppression in which, with a vehicle standing still and nonetheless a movement of the vehicle being recognized, an increase in the braking effect takes place independently of the driver, in particular by an increase of braking pressure via the activation of a supply pump. This design approach also includes a standing start aid in which when the accelerator pedal is pressed and a specified threshold for the delivered engine torque is exceeded, the braking pressure required to hold the vehicle is reduced. Here also, not all standing start situations may be optimally taken into account.

SUMMARY OF THE INVENTION

An exemplary embodiment and/or exemplary method of the present inventions are directed to the activation of the standing start aid or the hillholder function, as a function of the slope of the road and/or with an engaged parking brake optimizes standing start situations in which the vehicle may roll backwards.

It may be of a particular advantage that in vehicles with manually shifted transmissions, the driver is largely relieved of the complex interaction of hand brake, accelerator pedal and clutch during a standing start operation, in particular if he is starting on a slope. For that reason, the standing start aid may be advantageously activated when it is actually needed, namely when a positive slope of the road is present in the vehicle's direction of travel. The standing start aid is thus active when the road rises in the direction of travel.

The result is a very good support in a standing start without undesirable side effects, which can adversely affect the ease of driving in other situations. A gain in safety may be attained for the inexperienced driver when making standing starts on slopes and a gain in ease may be attained for the experienced driver.

Even after a short period of familiarization with the standing start aid, relieving the driver of its use during the standing start operation might make the parking brake superfluous except for parking the vehicle.

The operational reliability may be provided in a particularly advantageous manner in that the function is only active if a gear is engaged. This is used as a sign that the driver is ready to brake. Thus, in the event that the standing start aid fails, e.g., in a breakdown of the vehicle electrical system, it is ensured that the driver holds the vehicle with the aid of the service brake and/or the parking brake.

In addition, it is ensured that the vehicle is held over an extended period of time without pressing the brake pedal. If the vehicle begins to creep away due to leaks or a gradual release of the brakes, the braking pressure is increased automatically independently of the depression of the brake pedal to prevent such creep.

It is of particular significance that taking the signal of a slope sensor as well as the operating state of the drive unit into account makes it possible to determine a suitable release time, resulting in a standing start aid which altogether has greater ease of use.

DETAILED DESCRIPTION

Figure 1:
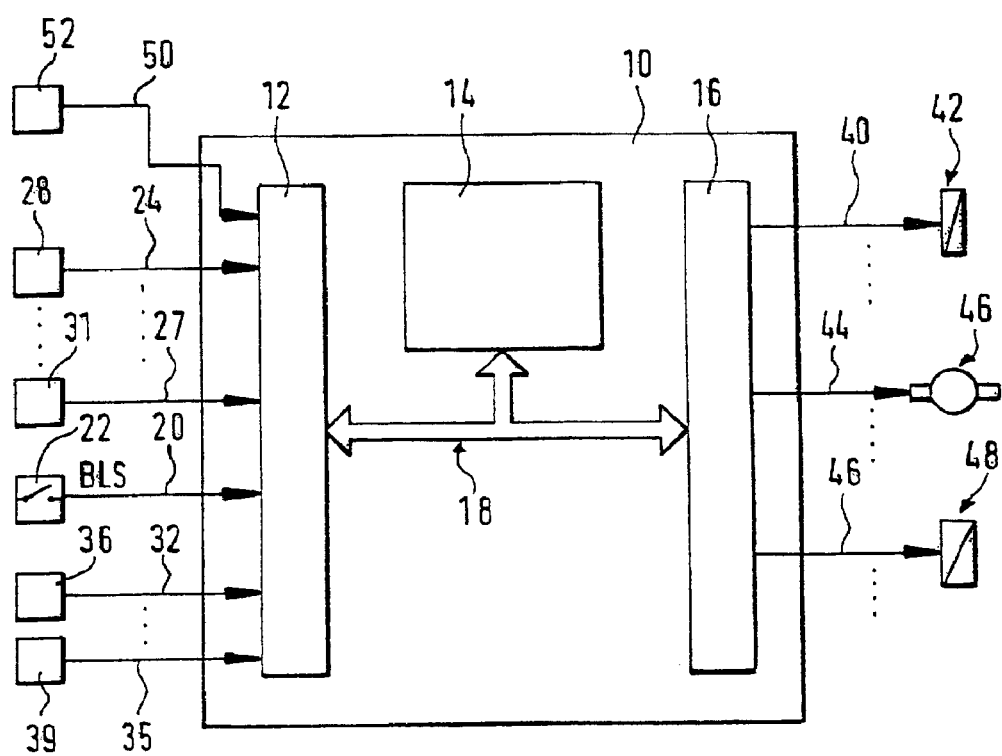
FIG. 1 shows an exemplary control device for the braking system of a vehicle in which the standing start aid or hillholder function described below is implemented.

FIG. 1 shows a control unit 10 for controlling the braking system of a vehicle. This control unit 10 includes an input circuit 12, at least one microcomputer 14 and one output circuit 16. The input circuit, microcomputer, and output circuit are connected together for the mutual exchange of data using a communication system 18. Input lines (which may be a bus system, e.g., CAN) connect various measuring instruments to input circuit 12. A first input line 20 leads from a brake pedal switch 22 to control unit 10 and transmits a brake pedal switch signal BLS to it. Input lines 24 to 27 connect control unit 10 with wheel speed sensors 28 to 31, via which signals relating to the speeds of the vehicle's wheels are supplied.

Moreover, additional input lines 32 to 35 are provided via which at least the following values from corresponding measuring instruments or other control systems are transmitted: an actuation value α of an accelerator pedal or of an engine control unit sends the information as to whether the accelerator pedal is pressed or not; a switching signal which indicates that a parking brake is engaged; a value GANG which provides the information concerning an engaged gear; a value M from an engine control which represents a measure for the set engine torque and/or the engine torque to be set and/or a value NMOT which represents the speed of the drive unit; a value which indicates if the drive unit of the vehicle is running. In addition, an input line 50 is provided which connects control unit 10 with a slope sensor 52. The latter outputs a signal from which the slope of the road and its direction is derived.

Output lines are attached to output circuit 16 of control unit 10 which activate the control elements for the control of the vehicle's wheel brakes. In the exemplary embodiment, the braking system is a hydraulic braking system so that output lines 40 lead to valves 42 for controlling the braking pressure in the individual wheel brakes, while optionally at least one pressure-generating means 46 (pump) for the individual brake circuits is activated via output lines 44. At least one control valve 48 is activated via output line 46, the control valve holding the braking pressure constant when the brake pedal is depressed for the purposes of the described hillholder function. In the embodiment, this is at least one control valve, the switching valve provided for the implementation of the traction control system, which interrupts the connection between the brake master cylinder and the wheel brakes. Instead of this valve, the braking pressure is also locked in by valves 42 which control the wheel braking pressure. Depending on the design, braking pressure lock-in takes place in all or in selected wheel brakes.

The above-described embodiment is not limited to the application with one specific type of braking system. The device with the corresponding advantages is thus also used with air-brake systems or in combination with electrohydraulic, electromotive and/or electropneumatic braking systems. In this connection, the braking force set by the brake pedal operation specified by the driver via conventional brake lines or by electrical means is maintained or increased at individual wheel brakes using an active hillholder function by the switching of valves and possibly pumps and/or using constant control signals, by the switching of control signals to specific values or by the operation of clutches. In electromotive braking systems in particular, the electromotive brake controller is activated via electrical control signals to apply a specific braking force or is locked in a specific position.

In another exemplary embodiment, control unit 10, in this case microcomputer 14, implements at least one traction control system and optionally in addition a driving dynamics control program by controlling the vehicle's braking system. Such controls may be available from the related technology. In addition, the following described standing start aid or hillholder function is provided as a supplemental function which, in addition to a parking brake effect, is also used as a standing start aid on slopes and/or as creep suppression.

The described standing start aid or hillholder system is intended to free the driver of a vehicle having a manually shifted transmission from using the hand brake when making a standing start on a slope. This is attained in such a way that by locking in the braking pressure applied by the driver, i.e., maintaining the applied braking pressure (brake application force), the vehicle is prevented from rolling backwards until the actual standing start operation. This occurs when the slope measured, for example, by a slope sensor, is positive in the direction of the standing start, i.e., it must be feared that the vehicle will roll backwards against the expected direction of travel. A similar operation is carried out with the parking brake engaged and the service brake not depressed. In this case, since as a rule, no braking force obtained from the driver can be locked in, the vehicle is also held in place via an active buildup of braking force when the parking brake is released until the driver starts to drive ahead or the gear is disengaged.

In the embodiment of the standing start aid or of the hillholder, the closing of valves, the switching valves in particular, locks in the braking pressure applied by the driver in the wheel brake calipers. Preferably, this takes place in all the wheels of the vehicle to reliably prevent the vehicle from rolling backwards. The closing of the valves and accordingly the locking in of the pressure take place if the activation condition is present. This assumes that the driver has depressed the brake pedal and the vehicle has come to a complete stop. The former is determined by the switching state signal or by a brake pedal actuation signal (e.g., from a potentiometer); the latter is determined on the basis of at least one wheel speed, e.g., in the manner discussed above. Moreover, the slope in the direction of the standing start must be positive, the engine running, and/or one gear step or one gear must have been engaged. In place of the condition of the engaged brake, active pressure is built up in the wheel brakes by activation of a pump if the parking brake is engaged and the above-mentioned conditions are present except for the depressed brake pedal.

In the exemplary embodiment of a hydraulic braking system having a hydraulic unit intended for the active buildup of braking pressure independently of the driver, upon being activated, the braking pressure is locked in via the flow of fluid through at least one reversing valve which prevents a back flow of the brake fluid from the wheel brake cylinders. Non-return valves located in parallel to the switching valves make it possible for the driver to increase the braking pressure even with the valves closed. The locked-in braking pressure is again released by opening the reversing valves if the deactivation conditions are present. Examples of such hydraulic systems may be available from the related technology.

If a leak or other pressure losses occur during the time the braking force is maintained, the pressure loss is again compensated via the activation of a pump, which may be a return pump, and of valves which permit the inflow of brake fluid. This is primarily the case when the vehicle is held for an extended period of time by the standing start aid or hillholder without pressing the brake pedal. Depending on the embodiment, the buildup of braking pressure then occurs if the braking pressure falls below a specified limit or if it is detected that the vehicle is creeping away. The latter is determined, for example, on the basis of the wheel speed signals which sense a movement of the vehicle. If this is the case, in the embodiment, the wheel braking pressures are increased by a brief, slight operation of the return pump.

It is concluded from the stopping operation how much surplus braking pressure was used to brake to a standing position (pulse set). Then the pressure loss in the braking system is simulated via a leakage model (as a rule non-linear, e.g., a pressure-dependent e-function). If the pressure estimated in this manner approaches a pressure critical for starting to roll, the pressure is increased without vehicle movement (preventive leak compensation). The pressure critical for starting to roll is specified. This procedure is "learned" in the following manner:

If unanticipated, premature rolling occurs, the estimate of the leak is too imprecise. The leakage value of the simulation is increased, i.e., at least one factor in the leakage model is changed, e.g., in the case of an e-function, a factor describing dependence on time.

If, due to the preventive leak compensation, no rolling occurs, this leakage value is gradually reduced since the leakage model may possibly estimate too great a leak.

The braking pressure is reduced if the deactivation conditions are present. The suitable release time is believed to be and/or may be critical for the ease of the standing start aide or of the hillholder. This release time is obtained from the information of the slope sensor and the electronic engine management system. The latter supplies performance quantities such as engine torque (desired by the driver or presently produced), information regarding the accelerator pedal position and/or the engine speed. Release takes place when the engine is taken out of gear, the slope in the standing start direction (forward or reverse gear) is no longer positive or the driver wishes to make a standing start. A desire for a standing start by the driver is present if the brake has been released and sufficient engine torque has been built up to propel the vehicle forward against the existing slope of the road. This means that a threshold value is formed as a function of the magnitude of the slope of the road, the locked-in braking pressure or the maintained braking force being released if the torque of the drive unit exceeds this threshold value. The operation of the accelerator pedal is analyzed depending on the embodiment, and the engine speed, the desired and/or actual torque of the drive unit is compared with a specified, slope-dependent threshold.

In the exemplary embodiment, the above-described function is implemented as a program of the computing unit of the control unit for the control of the braking system, the program being stored in a memory within or outside the computing unit or being supplied from an external memory. An example of such a program is described on the basis of the flow charts of FIGS. 2 and 3.

Locking-in of the braking pressure will be described below in connection with the standing start aid or the hillholder function. In particular with a view toward systems without pressure medium, this may be understood as the brake application force applied to the wheel brake, here called braking force.

Figure 2:
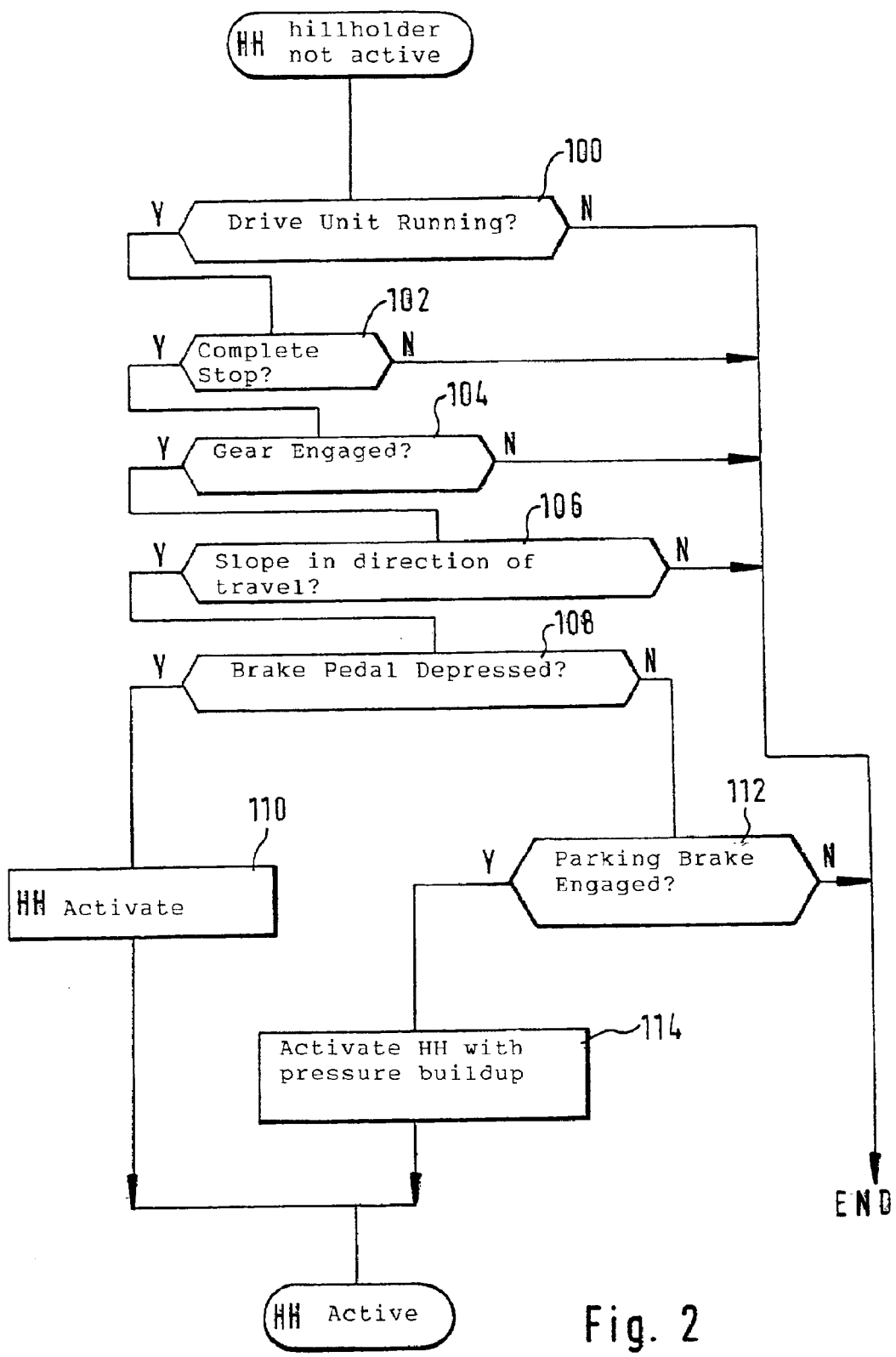
FIG. 2 shows an exemplary method of the starting aid or the hillholder function as a flow chart, which provides an implementation of the above-named functions as a program of a computer of the control unit for the vehicle braking system.

The program shown in FIG. 2 runs in predetermined time intervals with the supply voltage switched on when the standing start aid or hillholder is not active. This is determined on the basis of a flag. In the first step 100, it is checked as to whether the drive unit is running. Subsequently in step 102, if the drive unit is running, it is checked as to whether the vehicle is completely stopped. This takes place, for example, on the basis of the wheel speed signals. In the event of a yes response, it is checked in the subsequent step 104 as to whether a gear is engaged. This may be a forward gear or a reverse gear. If a gear is engaged, on the basis of the information from a slope sensor and possibly the gear information, in the subsequent step 106, it is checked as to whether there is a slope pointing in the direction of travel, i.e., whether the vehicle must start to travel against the slope. If this is the case, it is checked in step 108 as to whether the brake pedal is depressed. If this is also the case, according to step 110, the standing start aid or the hillholder is activated by, for example, switching valves as described above and locking in the braking pressure prevailing in the wheel brakes as a consequence of pressing the brake pedal.

Figure 3:
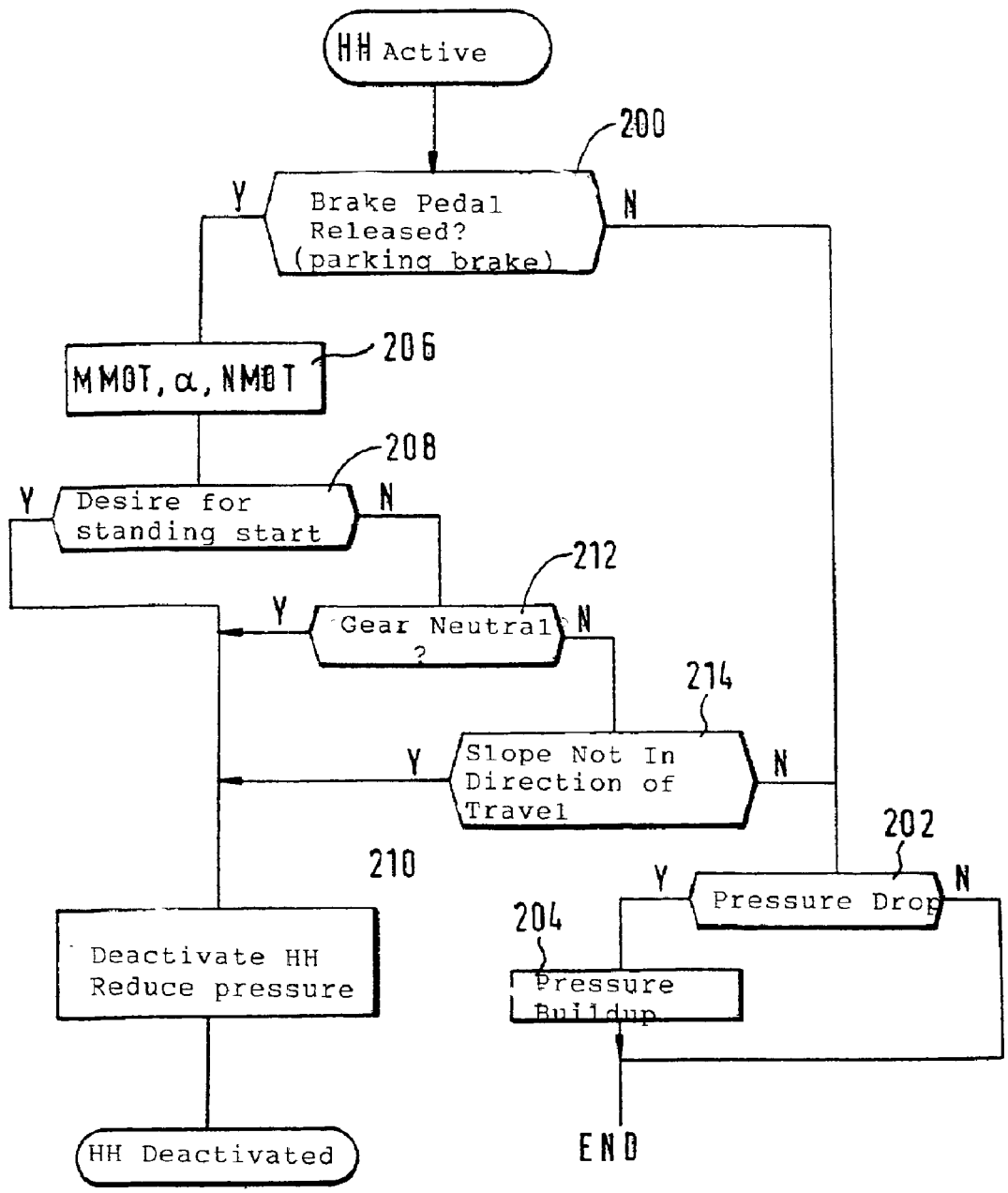
FIG. 3 shows another exemplary method of the starting aid or the hillholder function as a flow chart, which provides an implementation of the above-named functions as a program of a computer of the control unit for the vehicle braking system.

If, according to step 108, the brake pedal is not depressed, a check is made in step 112 as to whether the parking brake is engaged instead. This is done by analyzing a corresponding switching signal. If the parking brake is engaged, the standing start aid or hillholder is activated in step 114, active pressure being built up in the wheel brakes. This may take place by activating a pump which builds up a specific pressure in the wheel brakes. If a no response is the result of steps 100, 102, 104, 106 or 112, the function is not activated. In this case, the program is terminated and run again at the next time interval. After steps 110 and 114, the active flag is set and the program according to FIG. 3 is run, also in predetermined time intervals.

In the first step 200, a check is made as to whether the brake pedal or the parking brake is released. If this is not the case, the system is in standing start aid or hillholder operation. This means that the valves are activated in such a way that the braking pressure is maintained or the brake controller is activated in such a way that the braking force applied by the driver or the braking force applied independently of the driver is maintained. If a pressure or braking force drop is recognized in step 202, which is recognized, for example, on the basis of the measured braking pressure or the measured braking force and/or by the speed signal on the basis of rolling backwards, then pressure is built up according to step 204. After step 204 or in the case of a no response in step 202, the program is terminated and run again at the next time interval.

If it was determined in step 200 that the brake pedal is released, then in step 206 the variables supplied by the engine control, engine torque (desired and/or actual torque) Mmot and accelerator pedal position α, and optionally engine speed Nmot are read in. It is determined from at least one of these variables in step 208 whether the driver desires to make a standing start. This takes place in such a way that, for example, based on the accelerator pedal position signal, it is checked whether the accelerator pedal has been operated. In addition, a limit value for the engine torque and/or the engine speed as a function of the slope of the road is present.

If the engine torque and/or the engine speed specified by the driver or generated by the drive unit exceeds this limit value, then a desire for a standing start must be assumed. This is because the engine torque set by the driver or the set speed is sufficient to overcome the slope of the road and to move the vehicle against this slope.

If the desire for a standing start was thus recognized, then according to step 210, the standing start aid or the hillholder is deactivated and the pressure is reduced. This takes place by activation of the brake controllers, which reduce the braking pressure or the braking force either abruptly or in a metered fashion, for example, in accordance with a time function. After step 210 the program is terminated, the "non-active" flag is set and the program outlined in FIG. 2 is run. If step 208 did not indicate the desire for a standing start, then in step 212, a check is made as to whether a neutral gear was selected. If this is the case, step 210 follows; otherwise a check is made in step 214 as to whether the slope of the road is no longer positive in the direction of travel (e.g., change of gears from forward to reverse). If this is the case, step 210 follows and the function is deactivated, while in the event of a no response, step 202 follows. Query step 200 and accordingly also the "no branch" are eliminated in one embodiment, in particular, if a comfortable braking pressure reduction design is desired for the driver and/or if a braking system with active pressure buildup is present.

The above-named conditions for the deactivation are used individually or in any desired combination, depending on the design. The above-named conditions which supplement the condition of the positive slope of the road or that of the engaged parking brake are used in any desired combination for at least one of these conditions, depending on the design.

What is claimed is:

1. A method for controlling a wheel brake of a vehicle, the method comprising:

determining a road slope;

determining whether a brake pedal is depressed and whether a parking brake is engaged;

maintaining a braking force at a wheel independently of an extent of a brake pedal actuation, in at least one operating state with one of the brake pedal depressed and the parking brake engaged, if the road slope points in a direction of a future travel direction of the vehicle; and monitoring for braking pressure losses while the braking force is maintained;

compensating for the braking pressure losses; and reducing the braking force for at least one condition.

2. The method of claim 1, wherein the braking force is maintained if at least one of the following is satisfied: a drive unit is running; the vehicle is at a complete standstill; and a gear is engaged.

3. The method of claim 1, wherein the braking force is reduced if at least one of the following is recognized: a driver acts to make a standing start; a neutral gear is engaged; and the road slope is no longer in a travel direction.

4. The method of claim 3, wherein the braking force is reduced if the brake pedal is released.

5. The method of claim 1, further comprising determining whether the vehicle has come to a complete stop and maintaining the braking force at a wheel independently of an extent of a brake pedal actuation, in at least one operating state with one of the brake pedal depressed and the parking brake engaged, if the road slope points in a direction of a future travel direction of the vehicle and if the vehicle is at a complete stop.

6. A storage medium for storing at least one computer program, wherein the at least one stored computer program is operable for executing in a computing unit a method for controlling a wheel brake of a vehicle, the method comprising:

determining a road slope;

determining whether a brake pedal is depressed and whether a parking brake is engaged;

maintaining a braking force at a wheel independently of an extent of a brake pedal actuation, in at least one operating state with one of the brake pedal depressed and the parking brake engaged, if the road slope points in a direction of a future travel direction of the vehicle; and monitoring for braking pressure losses while the braking force is maintained;

compensating for the braking pressure losses; and reducing the braking force for at least one condition.

7. A method for controlling a wheel brake of a vehicle, the method comprising:

determining a road slope;

determining whether at least one of a brake pedal is depressed and a parking brake is engaged, both the brake pedal in a depressed state and the parking brake in an engaged stated producing a braking force;

maintaining the braking force at a wheel independently of an extent of a brake pedal actuation, in at least one operating state with one of the brake pedal depressed and the parking brake engaged, if the road slope points in a direction of a future travel direction of the vehicle; and monitoring for braking pressure losses while the braking force is maintained;

compensating for the braking pressure losses; and reducing the braking force for at least one condition.

8. A storage medium for storing at least one computer program, wherein the at least one stored computer program is operable for executing in a computing unit a method for controlling a wheel brake of a vehicle, the method comprising:

determining a road slope;

determining whether at least one of a brake pedal is depressed and a parking brake is engaged, both the brake pedal in a depressed state and the parking brake in an engaged stated producing a braking force;

maintaining the braking force at a wheel independently of an extent of a brake pedal actuation, in at least one operating state with one of the brake pedal depressed and the parking brake engaged, if the road slope points in a direction of a future travel direction of the vehicle; and monitoring for braking pressure losses while the braking force is maintained;

compensating for the braking pressure losses; and reducing the braking force for at least one condition.

* * * * *